(12) United States Patent
Wei et al.

(10) Patent No.: US 12,418,953 B2
(45) Date of Patent: Sep. 16, 2025

(54) METHOD AND APPARATUS FOR SESSION MANAGEMENT

(71) Applicant: Telefonaktiebolaget LM Ericsson (PUBL), Stockholm (SE)

(72) Inventors: Zhansheng Wei, Shanghai (CN); Yingjiao He, Shanghai (CN); Jinyin Zhu, Shanghai (CN); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 652 days.

(21) Appl. No.: 17/631,725

(22) PCT Filed: Aug. 4, 2020

(86) PCT No.: PCT/CN2020/106883
§ 371 (c)(1),
(2) Date: Jan. 31, 2022

(87) PCT Pub. No.: WO2021/023191
PCT Pub. Date: Feb. 11, 2021

(65) Prior Publication Data
US 2022/0287136 A1 Sep. 8, 2022

(30) Foreign Application Priority Data
Aug. 5, 2019 (WO) ................. PCT/CN2019/099298

(51) Int. Cl.
*H04W 76/20* (2018.01)
*H04W 24/10* (2009.01)
(Continued)

(52) U.S. Cl.
CPC ........... *H04W 76/20* (2018.02); *H04W 24/10* (2013.01); *H04W 72/23* (2023.01); *H04W 72/542* (2023.01)

(58) Field of Classification Search
CPC ................. H04M 15/00; H04M 17/00; H04M 2215/2026; H04M 2215/32; H04W 4/24
See application file for complete search history.

(56) References Cited

U.S. PATENT DOCUMENTS 10,448,268 B1 * 10/2019 Jaya ...................... H04W 76/19
10,531,515 B1 * 1/2020 Engelhart ............. H04M 15/71
(Continued)

FOREIGN PATENT DOCUMENTS

KR 20200015303 A * 2/2020 ......... H04L 43/0894
WO 2018 126981 A1 7/2018
(Continued)

OTHER PUBLICATIONS

First Office Action issued for Chinese Application Serial No. 202080055780.3—May 25, 2023.
(Continued)

*Primary Examiner* — Charles N Appiah
*Assistant Examiner* — Frank E Donado
(74) *Attorney, Agent, or Firm* — Baker Botts L.L.P.

(57) ABSTRACT

Embodiments of the present disclosure provide method and apparatus for session management. A method at a control plane function comprises generating an information element to indicate a number of reports that the user plane function can send a usage report to the control plane function. The method further comprises sending the information element to the user plane function.

21 Claims, 14 Drawing Sheets

(51) Int. Cl.
*H04W 72/23* (2023.01)
*H04W 72/542* (2023.01)

(56) References Cited

U.S. PATENT DOCUMENTS

| | | | | |
|---|---|---|---|---|
| 2015/0312127 | A1* | 10/2015 | Leemet | H04L 41/5032 |
| | | | | 709/224 |
| 2018/0288630 | A1* | 10/2018 | Guirguis | H04W 52/146 |
| 2019/0141606 | A1 | 5/2019 | Qiao et al. | |
| 2019/0259097 | A1* | 8/2019 | Raleigh | H04M 15/68 |
| 2020/0022020 | A1* | 1/2020 | Yan | H04W 28/0289 |
| 2020/0092424 | A1* | 3/2020 | Qiao | H04L 12/1407 |
| 2022/0060924 | A1* | 2/2022 | Kang | H04L 12/1407 |

FOREIGN PATENT DOCUMENTS

| | | |
|---|---|---|
| WO | 2019 024980 A1 | 2/2019 |
| WO | 2022215008 A1 | 10/2022 |

OTHER PUBLICATIONS

3GPP TSG CT WG4 Meeting #85bis; Sophia Antipolis, France, Jul. 9-13, 2018; Change Request; 29.244 CR 0116 rev—Current version: 15.2.0; Title: Essential correction on reporting the usage for offline charging (C4-185054).

3GPP TS 29.244 V16.0.0 (Jun. 2019); 3rd Generation Partnership Project; Technical Specification Group Core Network and Terminals; Interface between the Control Plane and the User Plane Nodes; Stage 3 (Release 16).

3GPP TSG-CT WG4 Meeting #93, Wroclaw, Poland; Aug. 26-30, 2019; Change Request; 29.244 CR 0277 rev—Current version: 16.0.0; Title: Controlling of number of reports (C4-193252).

Extended European Search Report issued for Application No. / Patent No. 20849493.0-1216 / 4011171 PCT/CN2020106883—Jul. 19, 2023.

SA WG2 Meeting #116bis; Sanya, China; Source: Nokia, Alcatel-Lucent Shanghai Bell; Title: Charging and Usage Monitoring handling (S2-164985)—Aug. 29-Sep. 2, 2016.

3GPP TSG-SA5 Meeting #120; Belgrade, Serbia; Change Request; Title: Addition of PFCP session management measurements; Source to WG: Huawei; Source to TSG: S5 (S5-185613)—Aug. 20-24, 2018.

PCT International Search Report issued for International application No. PCT/CN2020/106883—Oct. 27, 2020.

PCT Written Opinion of the International Searching Authority issued for International application No. PCT/CN2020/106883—Oct. 27, 2020.

3GPP TSG-SA4 #91; Bangalore, India; Source: Qualcomm Incorporated; Title: Use Case on Measurement and Reporting of Interactivity Usage (S4-161175)—Oct. 24-28, 2016.

* cited by examiner

METHOD AND APPARATUS FOR SESSION MANAGEMENT

PRIORITY

This nonprovisional application is a U.S. National Stage Filing under 35 U.S.C. § 371 of International Patent Application Serial No. PCT/CN2020/106883 filed Aug. 4, 2020 and entitled "METHOD AND APPARATUS FOR SESSION MANAGEMENT" which claims priority to International Patent Application Serial No. PCT/CN2019/099298 filed Aug. 5, 2019 both of which are hereby incorporated by reference in their entirety.

TECHNICAL FIELD

The non-limiting and exemplary embodiments of the present disclosure generally relate to the technical field of communications, and specifically to methods and apparatuses for session management.

BACKGROUND

This section introduces aspects that may facilitate a better understanding of the disclosure. Accordingly, the statements of this section are to be read in this light and are not to be understood as admissions about what is in the prior art or what is not in the prior art.

In CUPS (control and user plane separation), a control plane (CP) function may provision one or more usage reporting rules (URRs) for a packet forwarding control protocol (PFCP) session in a PFCP session establishment request or a PFCP session modification request to request a user plane (UP) function to measure the network resources usage for example in terms of traffic data volume, duration (i.e. time) and/or events, according to the provisioned measurement method; and send a usage report to the CP function, when the measurement reaches a certain threshold, periodically or when detecting a certain event, according to the provisioned reporting triggers or when an immediate report is requested within an PFCP session modification request.

A packet data network (PDN) gateway (PGW or PDN GW) pause of charging procedure is optionally supported by a serving gateway (SGW) and PDN GW and has a purpose to limit a mismatch between PDN GW and SGW charging volume and packet counts. For PDN GW pause of charging support in CUPS, a dropped downlink (DL) traffic threshold can be armed in a SGW user plane (SGW-U) for triggering the PGW pause of charging feature. A SGW control plane (SGW-C) may instruct the SGW-U to measure the number of packets/bytes that are discarded in SGW-U and the criteria for reporting within the URR. Once the trigger of reporting is met, the SGW-U shall inform the SGW-C by reporting usage information. The SGW-C can then inform the PGW-C.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to clause 5.2.2.3 of 3rd Generation Partnership Project (3GPP) TS 29.244 V16.0.0, upon generating a usage report for a URR towards a CP function, the UP function shall reset its ongoing measurement counts for the related URR (i.e. the UP function shall report in a usage report the network resources usage measurement since the last usage report for that URR); re-apply all the thresholds (such as Volume/Time/Event Threshold) provisioned for the related URR, if the usage report was triggered due to one of the thresholds being reached; and continue to apply all the provisioned URR(s) and perform the related network resources usage measurement(s), until getting any further instruction from the CP function.

That means after sending a usage report for example triggered due to one of the thresholds (such as DROTH (Dropped DL Traffic Threshold)) being reached, the user plane will reset its ongoing measurement counts for the corresponding resource such as dropped packets. If the measurement counter reaches the one of the thresholds such as DROTH again, the user plane function will send usage report to the control plane function even the usage report is no more required by the control plane function, for example the charging has already been paused in PGW. In this case, the PFCP Session Report Request/Response has no value and increases the load in both the control plane function and the user plane function.

To overcome or mitigate at least one above mentioned problems or other problems or provide a useful solution, the embodiments of the present disclosure propose an improved session management solution.

Some embodiments of the present disclosure provide a mechanism to stop measurement and report for a usage reporting rule with a more efficient way. For example, when the charging has already been paused in a CP function such as PGW-C, another CP function such as SGW-C may indicate its user function such as SGW-U to inactivate the measurement of discarded packets/bytes and stop sending usage report message triggered by the threshold such as DROTH. When the pause charging in the CP function such as PGW-C has been stopped, said another CP function such as SGW-C can indicate its user function such as SGW-U to re-activate the measurement and usage report of discarded packets/bytes.

In an embodiment, a CP function (e.g. SGW-C or SMF (Session Management Function)) indicates a UP function (e.g. SGW-U or UPF (User plane Function)) with an indication (e.g. a new flag or Remove URR IE) to inactivate the measurement and report for a usage reporting rule. For example, the usage reporting rule may be used to measure the dropped downlink traffic. The indication may be sent in a session report response such as PFCP Session Report Response (as the response to a session report request such as the PFCP Session Report Request which may be triggered by a threshold such as Dropped DL Traffic Threshold).

In an embodiment, a CP function (e.g. SGW-C or SMF) indicates a UP function (e.g. SGW-U or UPF) to inactivate the measurement and report for a usage reporting rule in a session modification request such as PFCP session modification request. For example, the usage reporting rule may be used to measure the dropped downlink traffic. The CP function may indicate a UP function to inactivate the measurement and report for a usage reporting rule by initiating an additional session modification request such as PFCP Session Modification Request (e.g. remove the usage reporting rule or update usage reporting rule (e.g., a new flag)).

In an embodiment, a CP function (e.g. SGW-C or SMF) provisions the UP function (e.g. SGW-U or UPF), when a usage reporting rule is provisioned or modified, a new information element in the usage reporting rule that indicates to the UP function the usage report shall be generated only for a limit number of reports, and the UP function shall stop the measurement and report when the limit number of reports is reached. Additionally, the CP function such as SMF may add a time of period for the limit number of reports after which the UP function shall re-start the measurement and report for the usage reporting rule.

In an embodiment, the measure of the dropped downlink traffic may be re-activated when a control plane (such as PGW-C) pause charging is stopped (e.g. by the service request procedure or a PDN connection suspension as defined by 3GPP TS23.401 V16.2.0).

In a first aspect of the disclosure, there is provided a method at a control plane function. The method comprises generating an information element to indicate a number of reports that the user plane function can send a usage report to the control plane function. The method further comprises sending the information element to the user plane function.

In an embodiment, the method further comprises generating an information element to inactivate a measurement and report related to a usage reporting rule in a user plane function.

In an embodiment, generating an information element to inactivate a measurement and report related to a usage reporting rule in a user plane function may be in response to the control plane function receiving a usage report related to the usage reporting rule.

In an embodiment, the information element to inactivate a measurement and report related to a usage reporting rule in the user plane function may be sent in a session report response message or a session modification request message.

In an embodiment, the method may further comprise determining to activate the measurement and report related to the usage reporting rule in the user plane function. The method may further comprise sending an indicator to activate the measurement and report related to the usage reporting rule in the user plane function.

In an embodiment, the information element to indicate a number of reports that the user plane function can send a usage report to the control plane function may be sent in a session establishment request or a session modification request.

In an embodiment, the number of reports may be set to "1" for a usage reporting rule with a dropped downlink traffic threshold to support pause of charging feature.

In an embodiment, the information element to indicate a number of reports that the user plane function can send a usage report to the control plane function may be included in a usage reporting rule.

In an embodiment, the method may further comprise determining to activate the usage report in the user plane function. The method may further comprise sending an indicator to activate the usage report in the user plane function.

In an embodiment, a time of period for the number of reports may be set by the control plane function or the user plane function and after the time of period the user plane function restarts the measurement and report related to the usage reporting rule.

In an embodiment, the usage reporting rule and the usage report may be related to dropped downlink traffic.

In an embodiment, the usage reporting rule and the usage report may be related to a session.

In an embodiment, the control plane function may be one of packet data network (PDN) gateway control plane function (PGW-C), serving gateway control plane function (SGW-C), traffic detection function control plane function (TDF-C), and session management function (SMF), and the user plane function is one of PDN gateway user plane function (PGW-U), serving gateway user plane function (SGW-U), traffic detection function user plane function (TDF-U) and user plane function (UPF).

In a second aspect of the disclosure, there is provided a method at a user plane function. The method comprises receiving from a control plane function an information element to indicate a number of reports that the user plane function can send a usage report to the control plane function. The method further comprises performing at least one operation based on the information element.

In an embodiment, the method further comprises receiving from a control plane function an information element to inactivate a measurement and report related to a usage reporting rule in the user plane function.

In an embodiment, receiving from a control plane function an information element to inactivate a measurement and report related to a usage reporting rule in the user plane function may be in response to the user plane function sending a usage report related to the usage reporting rule.

In an embodiment, the information element to inactivate a measurement and report related to a usage reporting rule in the user plane function may be received in a session report response message or a session modification request message.

In an embodiment, the at least one operation may comprise inactivating the measurement and report related to a usage reporting rule in the user plane function.

In an embodiment, the method may further comprise receiving an indicator to activate the measurement and report related to the usage reporting rule in the user plane function The method may further comprise activating the measurement and report related to a usage reporting rule in the user plane function.

In an embodiment, the information element to indicate a number of reports that the user plane function can send a usage report to the control plane function may be received in a session establishment request or a session modification request.

In an embodiment, the at least one operation may comprise decrementing the number of reports by "1" after the user plane function sending the usage report to the control plane function and inactivating the measurement and report when the number of reports is decremented to "0".

In an embodiment, the method may further comprise receiving an indicator to activate the usage report in the user plane function or determining the time of period set for the number of reports has elapsed. The method may further comprise activating the usage report in the user plane function.

In a third aspect of the disclosure, there is provided an apparatus at a control plane function. The apparatus comprises a processor; and a memory coupled to the processor, said memory containing instructions executable by said processor, whereby said apparatus is operative to generate an information element to indicate a number of reports that the user plane function can send a usage report to the control plane function. Said apparatus is further operative to send the information element to the user plane function.

In an embodiment, said apparatus is further operative to generate an information element to inactivate a measurement and report related to a usage reporting rule in a user plane function.

In a fourth aspect of the disclosure, there is provided an apparatus at a user plane function. The apparatus comprises a processor; and a memory coupled to the processor, said memory containing instructions executable by said processor, whereby said apparatus is operative to receive from a control plane function an information element to indicate a number of reports that the user plane function can send a usage report to the control plane function. Said apparatus is further operative to perform at least one operation based on the information element.

In an embodiment, said apparatus is further operative to receive from a control plane function an information element to inactivate a measurement and report related to a usage reporting rule in the user plane function.

In a fifth aspect of the disclosure, there is provided a control plane function. The control plane function comprises a generating module configured to generate an information element to indicate a number of reports that the user plane function can send a usage report to the control plane function. The control plane function further comprises a first sending module configured to send the information element to the user plane function.

In an embodiment, the generating module is further configured to generate an information element to inactivate a measurement and report related to a usage reporting rule in a user plane function.

In an embodiment, the control plane function further comprises a first determining module (optional) configured to determine to activate the measurement and report related to the usage reporting rule in the user plane function. The control plane function further comprises a second sending module (optional) configured to send an indicator to activate the measurement and report related to the usage reporting rule in the user plane function.

In an embodiment, the control plane function further comprises a second determining module (optional) configured to determine to activate the usage report in the user plane function. The control plane function further comprises a third sending module (optional) configured to send an indicator to activate the usage report in the user plane function.

In a sixth aspect of the disclosure, there is provided a user plane function. The user plane function comprises a first receiving module configured to receive from a control plane function an information element to indicate a number of reports that the user plane function can send a usage report to the control plane function. The control plane function further comprises a performing module configured to perform at least one operation based on the information element.

In an embodiment, the first receiving module is further configured to receive from a control plane function an information element to inactivate a measurement and report related to a usage reporting rule in the user plane function.

In an embodiment, the user plane function further comprises a second receiving module (optional) configured to receive an indicator to activate the measurement and report related to the usage reporting rule in the user plane function. The user plane function further comprises a first activating module (optional) configured to activate the measurement and report related to the usage reporting rule in the user plane function.

In an embodiment, the user plane function further comprises a third receiving module (optional) configured to receive an indicator to activate the usage report in the user plane function. The user plane function may further comprise a determining module (optional) configured to determine the time of period set for the number of reports has elapsed. The user plane function further comprises a second activating module (optional) configured to activate the usage report in the user plane function.

In another aspect of the disclosure, there is provided a computer program product comprising instructions which, when executed on at least one processor, cause the at least one processor to carry out the method according to the first aspect of the disclosure.

In another aspect of the disclosure, there is provided a computer program product comprising instructions which, when executed on at least one processor, cause the at least one processor to carry out the method according to the second aspect of the disclosure.

In another aspect of the disclosure, there is provided a computer-readable storage medium storing instructions which, when executed on at least one processor, cause the at least one processor to carry out the method according to the first aspect of the disclosure.

In another aspect of the disclosure, there is provided a computer-readable storage medium storing instructions which, when executed on at least one processor, cause the at least one processor to carry out the method according to the second aspect of the disclosure.

Many advantages may be achieved by applying the proposed solution according to embodiments of the present disclosure. For example, some embodiments can avoid the invalid messages between the UP node and the CP node. Some embodiments can reduce the load in both the UP node and the CP node.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
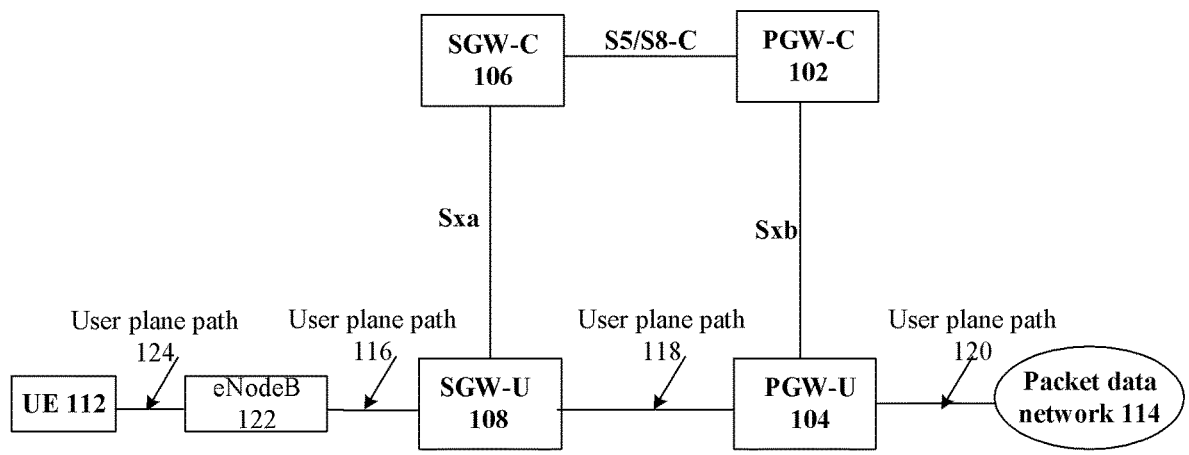
FIG. 1 schematically shows a system according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network device" or "network node" used herein refers to a network device such as a core network device in a communication network. For example, in a wireless communication network such as a 3GPP-type cellular network, the network node may comprise a control plane function (e.g., SMF, PGW-C and SGW-C) and a user plane function (e.g., UPF, PGW-U and SGW-U), etc., which may offer numerous services to customers who are interconnected by an access network device. Each access network device is connectable to the core network device over a wired or wireless connection.

The term "network function (NF)" refers to any suitable function which can be implemented in a network node such as a core network node of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), RAN (radio access network), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments below are mainly described in the context of a measurement and usage report of a usage reporting rule related to dropped downlink traffic, they are not limited to this but can be applied to any suitable usage reporting rule that can benefit from the embodiments as described herein.

Figure 2:
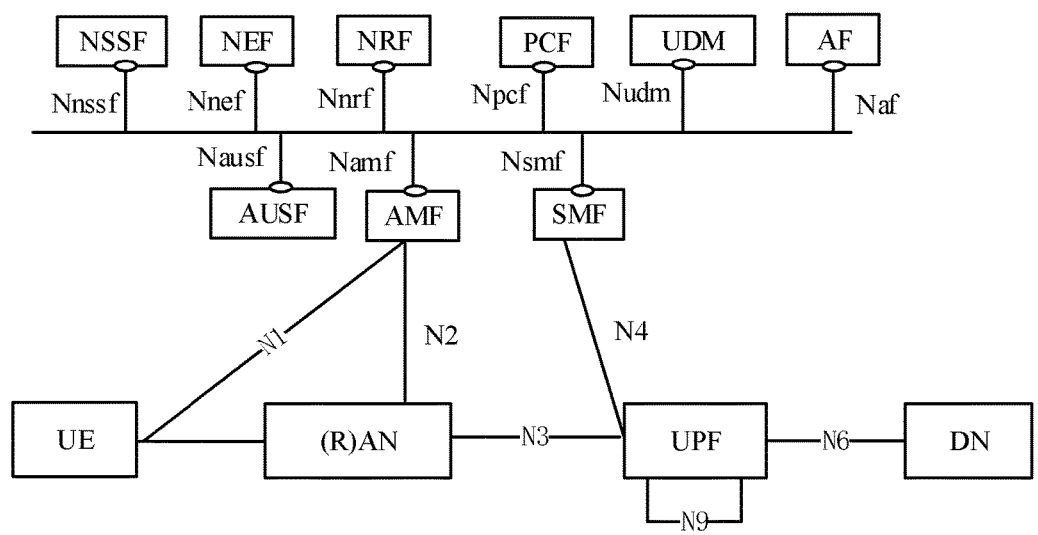
FIG. 2 schematically shows another system according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 1 and FIG. 2. For simplicity, the system architectures of FIGS. 1-2 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a system according to an embodiment of the present disclosure. As shown in FIG. 1, the system 100 may comprise a PGW-C 102, a PGW-U 104, a SGW-C 106, a SGW-U 108, a UE 112, an eNodeB (ENB) 122, and a packet data network 114. User plane paths 116, 118, 120, and 124 may be used by the UE 112 to connect to the packet data network 114. It is noted that the user plane paths 116, 118 and 120 may include any other suitable network devices (not shown in FIG. 1). The system 100 may be CUPS architecture as defined in 3GPP TS23.214 V16.0.0. With CUPS, Sxb interface is defined between PGW-C and PGW-U, Sxa interface is defined between SGW-C and SGW-U, and S5/S8 control plane interface is defined between PGW-C and SGW-C. This enables flexible network deployment and operation and the independent scaling between control plane and user plane functions while not affecting the functionality of the existing nodes subject to this split. It is noted that there may be multiple UEs though only one UE is shown in the system 100. Each PGW-C may manage/control one or more PGW-Us though only one PGW-U is shown in the system 100. Each SGW-C may manage/control multiple SGW-Us though only one SGW-U is shown in the system 100. Each PGW-C may be connected to one or more SGW-Cs though only one SGW-C is shown in the system 100. Each SGW-C may be connected to one or more PGW-Cs though only one PGW-C is shown in the system 100.

FIG. 2 schematically shows a high level architecture in the next generation network such as 5G. The system architecture of FIG. 2 may comprise some exemplary elements such as AUSF, AMF, DN, NEF, NRF, NSSF, PCF, SMF, UDM, UPF, AF, UE, (R)AN.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, and security. These may be critical for delivering a service in the network. The AUSF, AMF, DN, NEF, NRF, NSSF, PCF, SMF, UDM, UPF, AF, UE, (R)AN may include the functionality for example as defined in clause 6.2 of 3GPP TS23.501 V15.4.0, the disclosure of which is incorporated by reference herein in its entirety. For example, the NEF may act as a gateway which can enable external users to monitor, provision and enforce an application policy for users inside the network. The AUSF may be configured as an authentication server. The UDM can store subscriber data and profiles. The PCF can provide a policy framework incorporating network slicing, roaming and mobility management. The AMF can manage access control and mobility. The SMF can set up and manage sessions according to a network policy. The UPF can be deployed in various configurations and locations according to the service type.

Figure 3:
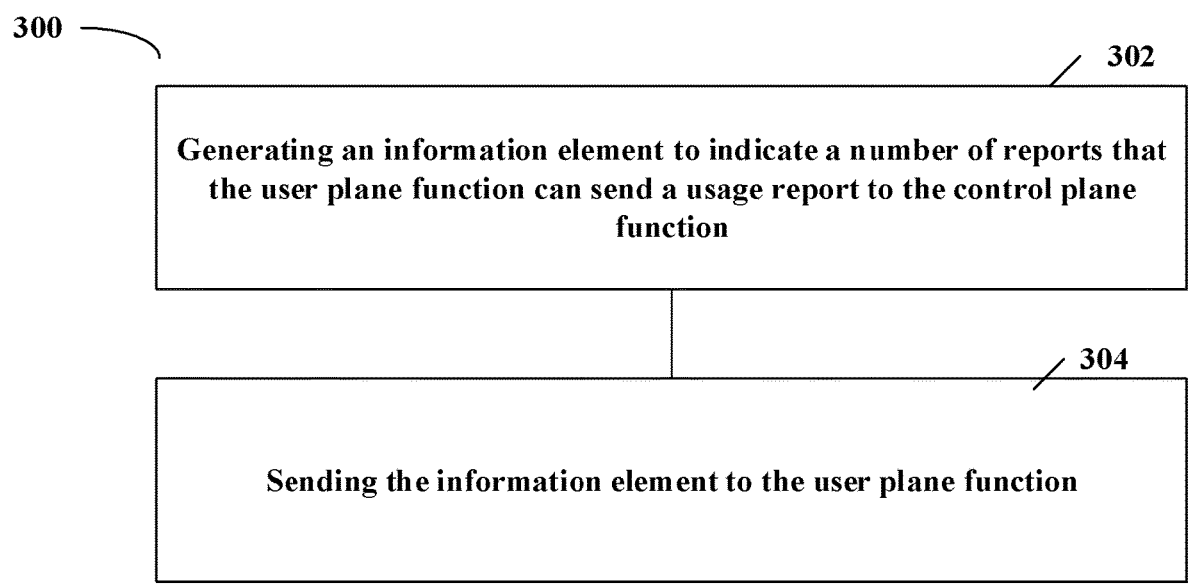
FIG. 3 shows a flowchart of a method according to an embodiment of the present disclosure.

FIG. 3 shows a flowchart of a method according to an embodiment of the present disclosure, which may be performed by an apparatus implemented in/at or communicatively coupled to a control plane function. As such, the apparatus may provide means for accomplishing various parts of the method 300 as well as means for accomplishing other processes in conjunction with other components. The control plane function may be any suitable node which can implement the control plane function. For example, the control plane function may be SGW-C, PGW-C, traffic detection function control plane function (TDF-C), or SMF, etc.

At block 302, the control plane function generates an information element to indicate a number of reports that the user plane function can send a usage report to the control plane function. In an embodiment, the control plane function further generates an information element to inactivate a measurement and report related to a usage reporting rule in a user plane function. The user plane function may be any suitable node which can implement the user plane function. For example, the user plane function may be SGW-U, PGW-U, traffic detection function control plane function (TDF-U), or UPF, etc. In general, the control plane function may have a corresponding user plane function. For example, when the control plane function is SGW-C, PGW-C, TDF-C or SMF, the user plane function may be SGW-U, PGW-U, TDF-U, or UPF respectively. The usage reporting rule may define how a packet shall be accounted as well as when and how to report the measurements. For example, the usage reporting rule may be similar to Usage Reporting Rule (URR) as defined in 3GPP TS 23.214 V16.0.0.

In an embodiment, the usage reporting rule and the usage report may be related to dropped downlink traffic. For example, the control plane function such as SGW-C may instruct the user plane function such as SGW-U to measure the number of packets/bytes that are discarded in the user plane function such as SGW-U and the criteria for reporting within the usage reporting rule.

In an embodiment, the usage reporting rule and the usage report may be related to a session. For example, the session may correspond to a PDN connection for SGW and PGW or a TDF (traffic detection function) session for TDF or PDU (protocol data unit) session. In another embodiment, the usage reporting rule and the usage report may be related to a bearer or a service. In still another embodiment, the usage reporting rule and the usage report may be related to a Packet Detection Rule or any other suitable parameter(s).

The control plane function may generate the information element in various ways. In an embodiment, the control plane function may generate the information element to inactivate a measurement and report related to a usage reporting rule in a user plane function in response to the control plane function receiving a usage report related to the usage reporting rule. The usage report may be any other suitable usage report. In an embodiment, the usage report may be the usage report of dropped downlink traffic. For example, when a UE is in an idle mode. Downlink payload to the UE may be received by SGW-U from PGW-U. SGW-U may buffer the downlink data and SGW-U may inform SGW-C that the downlink data is received. SGW-C may send a downlink data notification message to MME (Mobility Management Entity) to page UE. MME may response with a downlink data notification acknowledgement. Before the UE becomes connected, if the downlink data still comes and the buffer is full, the downlink data is to be dropped. In addition, if the paging is failure, the buffered payload may also be dropped. When the dropped downlink data (e.g. bytes/packets) are reached to "Dropped DL Traffic Threshold", SGW-U may send Sx Session Report Request with Usage Report (e.g., triggered by DROTH) to SGW-C. Then SGW-C may generate the information element to inactivate the measurement of dropped downlink traffic in the user plane function.

In another embodiment, the control plane function may generate the information element to inactivate the measurement of dropped downlink traffic in the user plane function when the control plane function determine to inactivate the measurement and report (such as the measurement and report of dropped downlink traffic) related to the usage reporting rule due to various reasons. For example when the control plane function such as SMF has paused charging of a UE or the control plane function such as SGW-C has triggered another control plane function (such as PGW-C) pause charging of the UE, the control plane function such as SGW-C or SMF may generate the information element to inactivate the measurement and report related to dropped downlink traffic in the user plane function. In this embodiment, the control plane function may generate the information element to inactivate the measurement and report related to the usage reporting rule in the user plane function in any suitable time even if the usage report related to the usage reporting rule has not been received by the control plane function.

In another embodiment, the control plane function may generate an information element to indicate a number of reports that the user plane function can send a usage report to the control plane function in various ways. For example, this information element may be generated when the control plane function such as SGW-C receives a create session request from another network node such as MME. In another example, this information element may be generated when the control plane function such as SGW-C determines to change/update/reset the number of reports. The number of reports may be any suitable number (such as a natural number) for example depending on the specific usage reporting rule.

In an embodiment, a time of period for the number of reports may be set by the control plane function or the user plane function and after the time of period the user plane function restarts the measurement and report related to the usage reporting rule.

In an embodiment, the number of reports may be set to "1" for a usage reporting rule (URR) with a dropped downlink traffic threshold to support pause of charging feature.

In an embodiment, the information element to indicate a number of reports that the user plane function can send a usage report to the control plane function may be included in a URR.

At block 304, the control plane function sends the information element to the user plane function. The information element may be sent in any suitable message such as PFCP session report response or PFCP session modification request or PFCP session establishment request, etc.

In an embodiment, the information element to inactivate a measurement and report related to a usage reporting rule in the user plane function may be sent in a session report response message or a session modification request message. For example, when control plane function generates the information element to inactivate the measurement and report related to a usage reporting rule in a user plane function in response to the control plane function receiving a usage report related to the usage reporting rule from the user plane function, the control plane function may send to the user plane function the information element to inactivate a measurement and report related to a usage reporting rule in the user plane function in a session report response message or a session modification request message. The session report request message, the session report response message and the session modification request message may be similar to PFCP session report request message, PFCP session report response message and PFCP session modification request message as defined in 3GPP TS 29.244 V16.0.0.

In an embodiment, a new flag may be added (e.g., in PFCPSRRsp-Flags as defined in 3GPP TS 29.244 V16.0.0 or in Measurement Information IE) indicating that the user plane function shall stop the measurement and report for the URR for which the previous Session Report Request has been sent for (anything already measured shall be deleted while keeping the URR). For example, the new flag may be included in the session report response message or session modification request message. As a first example, the new flag may be added in PFCPSRRsp-Flags in Session Report Response. As a second example, the new flag may be added in Measurement Information IE in update URR IE in Session Modification Request. For example, the new flag may be set to 1 if the measurement and report for the URR shall be paused (inactive). When the new flag may be set to 0 or if the new flag is not present, the measurement and report for the URR shall be performed (active).

In an embodiment, Remove URR IE may be added to remove the URR. For example, the Remove URR IE may be included in the session report response message.

In an embodiment, the information element to indicate a number of reports that the user plane function can send a usage report to the control plane function may be sent in a session establishment request or a session modification request. As a first example, the control plane function such as SGW-C may initiate Sx Session Establishment request to a user plane function such as SGW-U, a URR may be created used to measure the counts for dropped packets/bytes. A new indicator "limited number of report flag" may be added within the URR attribute. Also the number of report is also included. Based on these information, the user plane function such as SGW-U may only report a number of reports when a condition is met until the control plane function such as SGW-C indicates the user plane function such as SGW-U to reactivate the URR again or the time of period set for the number of reports has elapsed. The "Sx Session Establishment request" may be similar to the corresponding message as described in 3GPP TS 29.244 V16.0.0. As a second example, when the control plane function determines to modify or update the number of reports, the information element to indicate the modified or updated number of reports may be sent in a session modification request. The "session modification request" may be similar to the PFCP session modification request as described in 3GPP TS 29.244 V16.0.0. As described above, a time of period may be set for the number of reports for example by the control plane function. For example, the information element including new IEs of "number of reports" and "time of period(or duration)" may be added in Create URR or Update URR IE in Session establishment request or Session Modification request.

In an embodiment, a new flag may be added (e.g., in Measurement Information IE in update URR IE) indicating that user plane shall stop the measure and report for the URR (anything already measured shall be deleted while keeping the URR). For example, the new flag may be included in a Session Modification Request.

In an embodiment, the Remove URR IE may be included in Session Modification Request to remove the URR.

Figure 4:
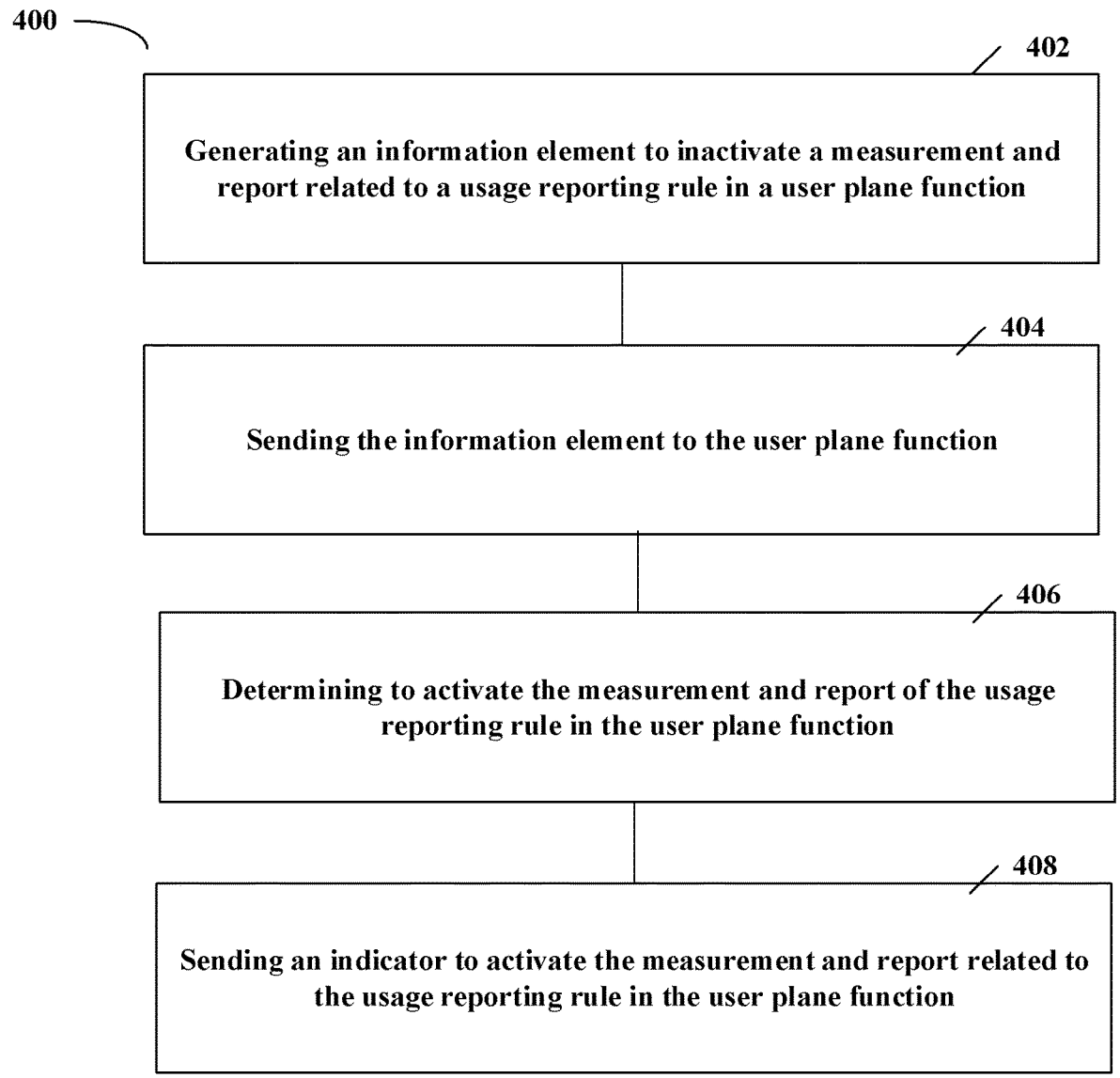
FIG. 4 shows a flowchart of a method according to another embodiment of the present disclosure.

FIG. 4 shows a flowchart of a method according to another embodiment of the present disclosure, which may be performed by an apparatus implemented in/at a control plane function or communicatively coupled to a control plane function. As such, the apparatus may provide means for accomplishing various parts of the method 400 as well as means for accomplishing other processes in conjunction with other components. The control plane function may be any suitable node which can implement the control plane function. For example, the control plane function may be SGW-C, PGW-C, TDF-C, or SMF, etc. For some parts which have been described in the above embodiments, the description thereof is omitted here for brevity.

At block 402, the control plane function generates an information element to inactivate a measurement and report related to a usage reporting rule in a user plane function. Block 402 is similar to block 302 of FIG. 3.

At block 404, the control plane function sends the information element to the user plane function. Block 404 is similar to block 304 of FIG. 3.

At block 406, the control plane function determines to activate the measurement and report related to the usage reporting rule in the user plane function. The control plane function may determine to activate the measurement and report related to the usage reporting rule in the user plane function due to various reasons, for example, the condition for inactivating the measurement and report related to the usage reporting rule is not satisfied. For example, when the PGW pause charging is to be stopped because of UE triggered service request or PDN connection suspension, etc., SGW-C may activate the measurement and report of the dropped packets/bytes for the PDN connection again.

At block 408, the control plane function sends an indicator to activate the measurement and report related to the usage reporting rule in the user plane function. The indicator may take any suitable form such as a flag. The indicator may occupy one or more bits. The indicator may be sent in an existing message or a dedicated massage. For example, the control plane function such as SGW-C can indicate to SGW-U that the measurement and report of dropped packets/bytes for a PDN connection shall be active by updating the URR or sending a new URR. When updating the URR, as described above, the new flag may be set to 0 or the new flag is not present in the updated URR. When the URR has been deleted in block 404, the new URR may be sent by the control plane function.

Figure 5:
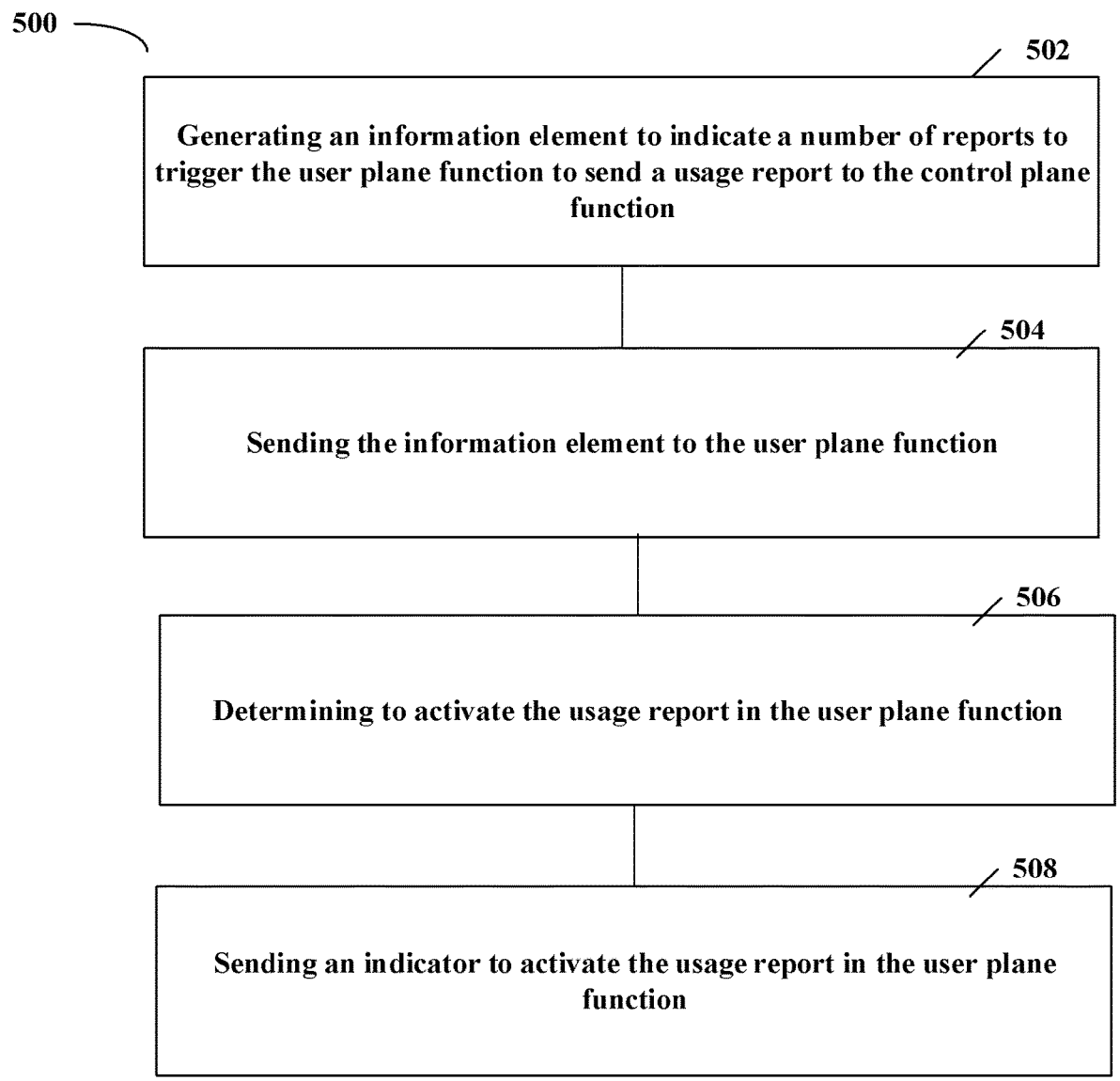
FIG. 5 shows a flowchart of a method according to another embodiment of the present disclosure.

FIG. 5 shows a flowchart of a method according to another embodiment of the present disclosure, which may be performed by an apparatus implemented in a control plane function or communicatively coupled to a control plane function. As such, the apparatus may provide means for accomplishing various parts of the method 500 as well as means for accomplishing other processes in conjunction with other components. The control plane function may be any suitable node which can implement the control plane function. For example, the control plane function may be SGW-C, PGW-C, TDF-C, or SMF, etc. For some parts which have been described in the above embodiments, the description thereof is omitted here for brevity.

At block 502, the control plane function generates an information element to indicate a number of reports that the user plane function can send a usage report to the control plane function. Block 502 is similar to block 302 of FIG. 3.

At block 504, the control plane function sends the information element to the user plane function. Block 504 is similar to block 304 of FIG. 3.

At block 506, the control plane function determines to activate the usage report in the user plane function. The control plane function may determine to activate the usage report in the user plane function due to various reasons, for example, the condition for inactivating the measurement and report related to the usage reporting rule is not satisfied. For example, when the PGW pause charging is to be stopped because of UE triggered service request or PDN connection suspension, etc., SGW-C may activate the measurement and report of the dropped packets/bytes for the PDN connection again.

At block 508, the control plane function sends an indicator to activate the usage report in the user plane function. The indicator may take any suitable form such as a flag. The indicator may occupy one or more bits. The indicator may be sent in an existing message or a dedicated massage. For example, the control plane function such as SGW-C can indicate to SGW-U that the measurement and report of dropped packets/bytes for a PDN connection shall be active by updating the URR. For example, the new flag set to 0 may be included in the updated URR or the new flag may be not present in the updated URR. When the user plane function receives this indicator, it may reset the number of reports as a predefined value or the configured value or an initiated value.

Figure 6:
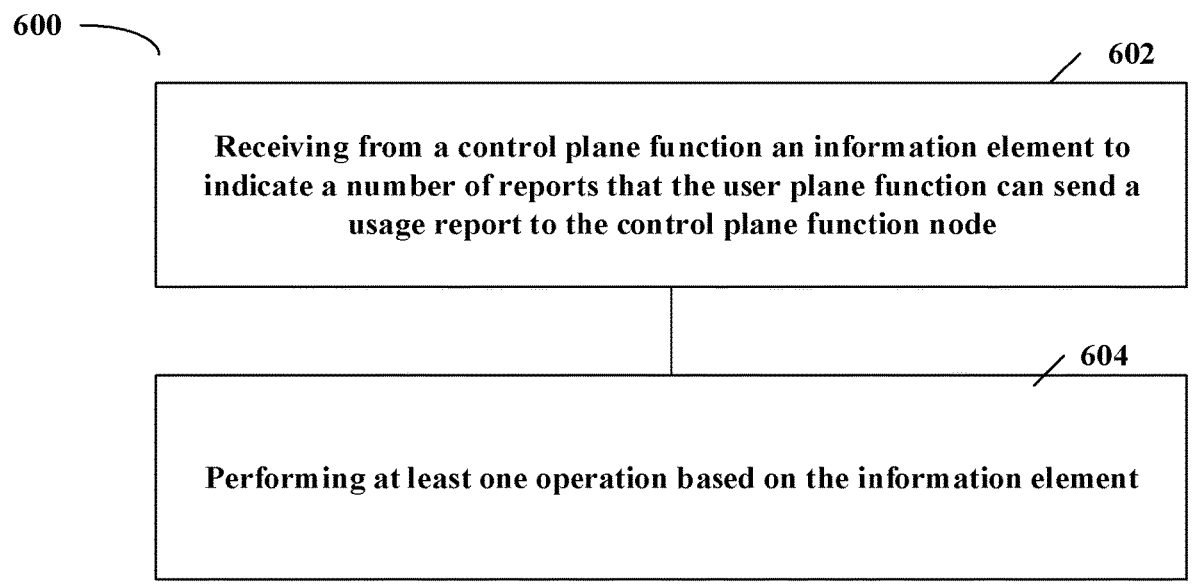
FIG. 6 shows a flowchart of a method according to another embodiment of the present disclosure.

FIG. 6 shows a flowchart of a method according to another embodiment of the present disclosure, which may be performed by an apparatus implemented in/at a user plane function or communicatively coupled to a user plane function. As such, the apparatus may provide means for accomplishing various parts of the method 600 as well as means for accomplishing other processes in conjunction with other components. The user plane function may be any suitable node which can implement the user plane function. For example, the user plane function may be SGW-U, PGW-U, traffic detection function user plane function (TDF-U), or UPF, etc. For some parts which have been described in the above embodiments, the description thereof is omitted here for brevity.

At block 602, the user plane function receives from a control plane function an information element to indicate a number of reports that the user plane function can send a usage report to the control plane function. In an embodiment, the user plane function further receives from the control plane function an information element to inactivate a measurement and report related to a usage reporting rule in the user plane function. As described above, a time of period may be set for the number of reports for example by the control plane function. In this case new IEs of "number of reports" and "time of period(or duration)" may be added in Create URR or Update URR IE in Session establishment request or Session Modification request. The control plane function may be SGW-C, PGW-C, TDF-C, or SMF, etc. For example, the control plane function may send the information element to the user plane function as described in block 304 of FIG. 3, then the user plane function may receive the information element from the control plane function.

In an embodiment, the user plane function may receive from the control plane function an information element to inactivate a measurement and report related to a usage reporting rule in the user plane function in response to the user plane function sending a usage report related to the usage reporting rule to the control plane function. For example, the user plane function may send the usage report related to the usage reporting rule to the control plane function, and then the control plane function will generate the information element and send it to the user plane function as described above.

In an embodiment, the information element to inactivate a measurement and report related to a usage reporting rule in the user plane function may be received in a session report response message or a session modification request message. For example, as described above the control plane function may send the information element in a session report response message or a session modification request message, then the user plane function may receive this information element in the session report response message or the session modification request message.

In an embodiment, the information element to indicate a number of reports that the user plane function can send a usage report to the control plane function may be received in a session establishment request or a session modification request. For example, the control plane function may send the information element in a session establishment request or a session modification request as described above, then the user plane function may receive this information element in the session establishment request or the session modification request.

At block 604, the user plane function performs at least one operation based on the information element. For example, when the information element to inactivate a measurement and report related to a usage reporting rule in the user plane function, the user plane function may inactivate the measurement and report related to the usage reporting rule. When the information element to indicate a number of reports that the user plane function can send a usage report to the control plane function, the user plane function may be triggered to send the usage report to the control plane function based at least on the number of reports. For example, when the number of reports is set as a number such as "1", then the user plane function will only sent one usage report to the control plane function. The user plane function may decrement the number of reports by "1" after the user plane function sending the usage report to the control plane function and inactivate the measurement and report when the number of reports is decremented to "0".

Figure 7:
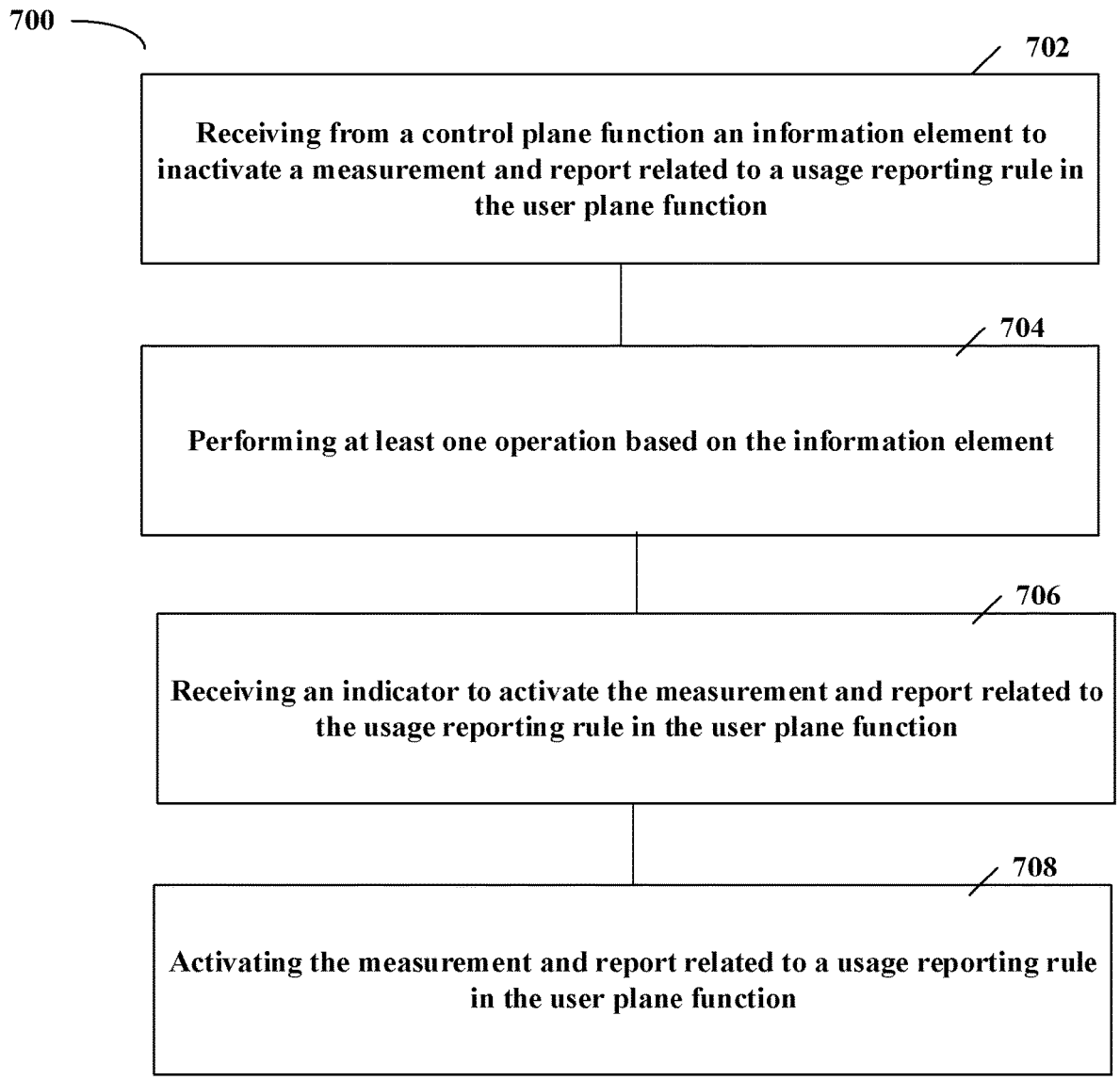
FIG. 7 shows a flowchart of a method according to another embodiment of the present disclosure.

FIG. 7 shows a flowchart of a method according to another embodiment of the present disclosure, which may be performed by an apparatus implemented in a user plane function or communicatively coupled to a user plane function. As such, the apparatus may provide means for accomplishing various parts of the method 700 as well as means for accomplishing other processes in conjunction with other components. The user plane function may be any suitable node which can implement the user plane function. For example, the user plane function may be SGW-U, PGW-U, TDF-U, or UPF, etc. For some parts which have been described in the above embodiments, the description thereof is omitted here for brevity.

At block 702, the user plane function receives from a control plane function an information element to inactivate a measurement and report related to a usage reporting rule in the user plane function. Block 702 is similar to block 602 of FIG. 6.

At block 704, the user plane function performs at least one operation based on the information element. Block 704 is similar to block 604 of FIG. 6.

At block 706, the user plane function receives an indicator to activate the measurement and report related to the usage reporting rule in the user plane function. For example, the control plane function may send this indicator at block 408 of FIG. 4, then the user plane function may receive this indicator.

At block 708, the user plane function activates the measurement and report related to the usage reporting rule in the user plane function.

Figure 8:
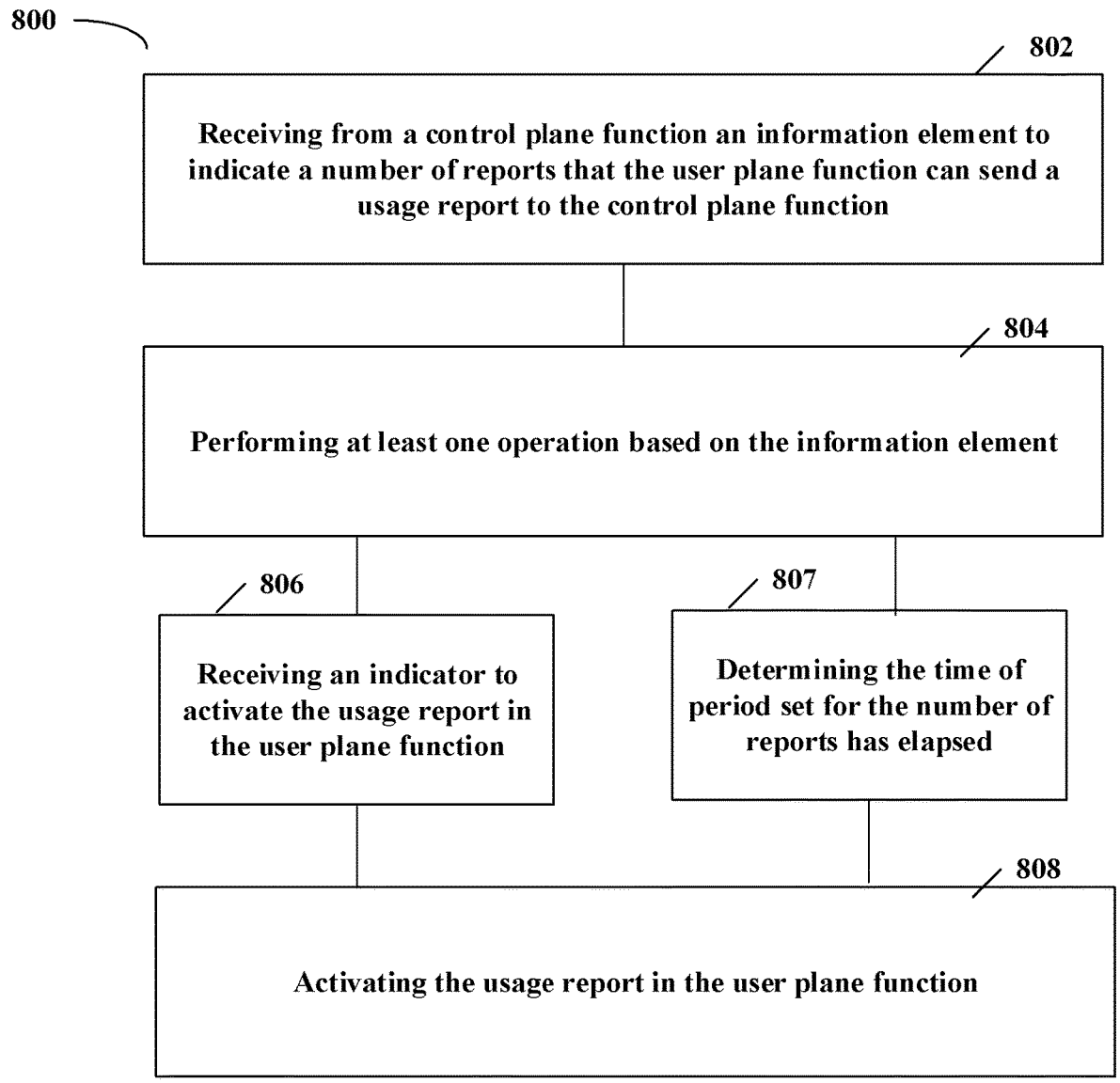
FIG. 8 shows a flowchart of a method according to another embodiment of the present disclosure.

FIG. 8 shows a flowchart of a method according to another embodiment of the present disclosure, which may be performed by an apparatus implemented in a user plane function or communicatively coupled to a user plane function. As such, the apparatus may provide means for accomplishing various parts of the method 800 as well as means for accomplishing other processes in conjunction with other components. The user plane function may be any suitable node which can implement the user plane function. For example, the user plane function may be SGW-U, PGW-U, TDF-U, or UPF, etc. For some parts which have been described in the above embodiments, the description thereof is omitted here for brevity.

At block 802, the user plane function receives from a control plane function an information element to indicate a number of reports that the user plane function can send a usage report to the control plane function. As described above, a time of period may be set for the number of reports for example by the control plane function or the user plane function. Block 802 is similar to block 602 of FIG. 6.

At block 804, the user plane function performs at least one operation based on the information element. Block 804 is similar to block 604 of FIG. 6.

At block 806, the user plane function receives an indicator to activate the usage report in the user plane function or determines the time of period set for the number of reports has elapsed. For example, the control plane function may send this indicator at block 508 of FIG. 5, then the user plane function may receive this indicator.

At block 808, the user plane function activates the usage report in the user plane function.

Figure 9:
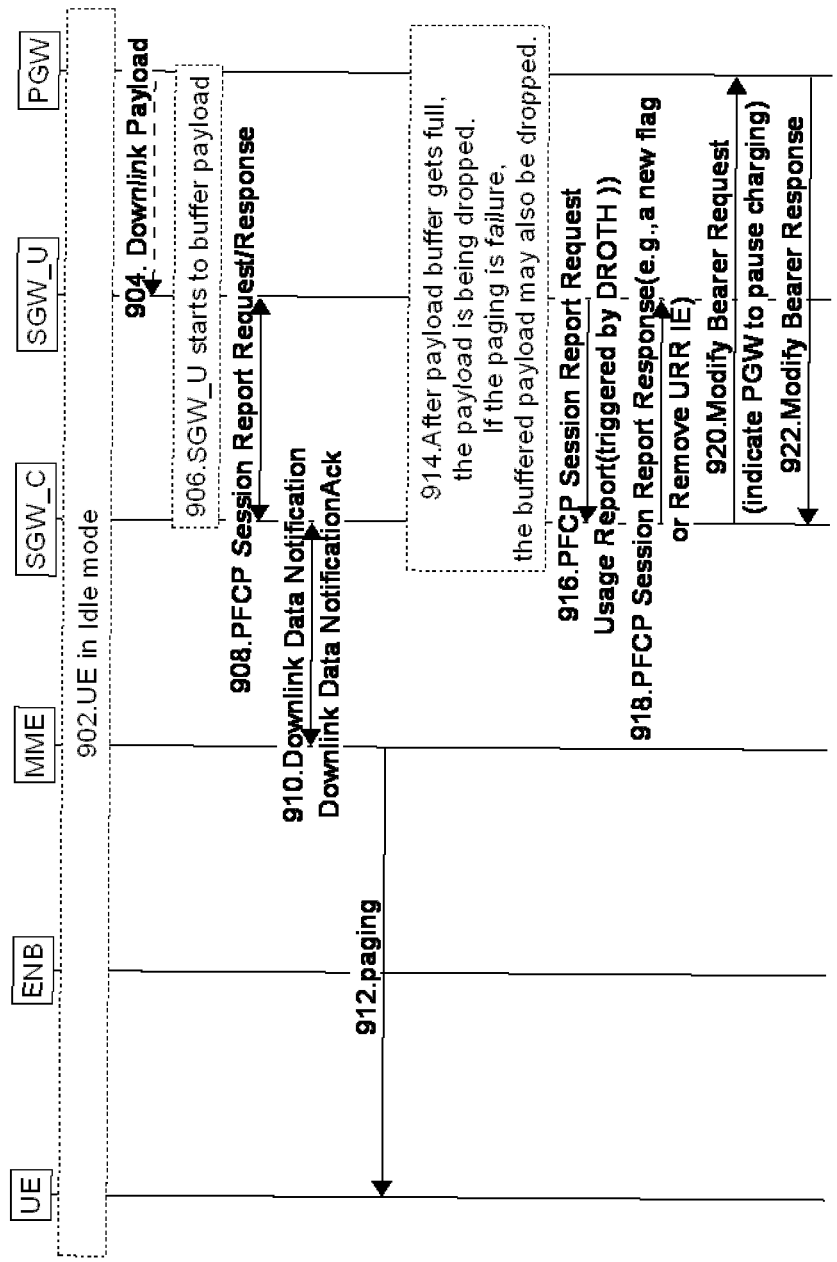
FIG. 9 shows a flowchart of a method according to another embodiment of the present disclosure.

FIG. 9 shows a flowchart of a method according to another embodiment of the present disclosure. For some parts which have been described in the above embodiments, the description thereof is omitted here for brevity.

At step 902, a UE is in an idle mode.

At step 904, downlink payload is received by SGW-U from PGW.

At step 906, SGW-U starts to buffer the downlink data.

At step 908, SGW-U informs SGW-C that the downlink data is received by using PFCP Session Report Request and SGW-C sends PFCP Session Report Response to SGW-U.

At step 910, SGW-C sends a Downlink Data Notification message to MME. MME response with a Downlink Data Notification Acknowledge (ACK).

At step 912, MME pages the UE.

At step 914, before the UE becomes connected, if the downlink data still comes and the payload buffer is full, the downlink data (e.g., payload) is to be dropped. If the paging is failure, the buffered payload may also be dropped.

At step 916, when the dropped bytes/packets are reached to "Dropped DL Traffic Threshold", SGW-U sends PFCP Session Report Request with Usage Report (triggered by DROTH)) to SGW-C.

At step 918, SGW-C indicates SGW-U with the new flag as described above or Remove URR IE to inactivate the measurement for the URR used to measure the dropped packets/bytes in PFCP Session Report Response. After receiving the new flag or removing the URR, SGW-U stops the measurement and report for the URR.

At step 920, SGW-C sends Modify Bearer Request to indicate to pause charging in PGW.

At step 922, PGW sends Modify Bearer Response.

The above messages as shown in FIG. 9 may be similar to the corresponding message as defined in 3GPP related technical specification (TS) such as TS 23.401, TS 23.402, TS29.244, TS23.214, etc. except that at step 918, after receiving the Usage Report triggered by DROTH from SGW-U, SGW-C sends the new flag or Remove URR IE and then SGW-U stops the measurement for the URR.

Figure 10:
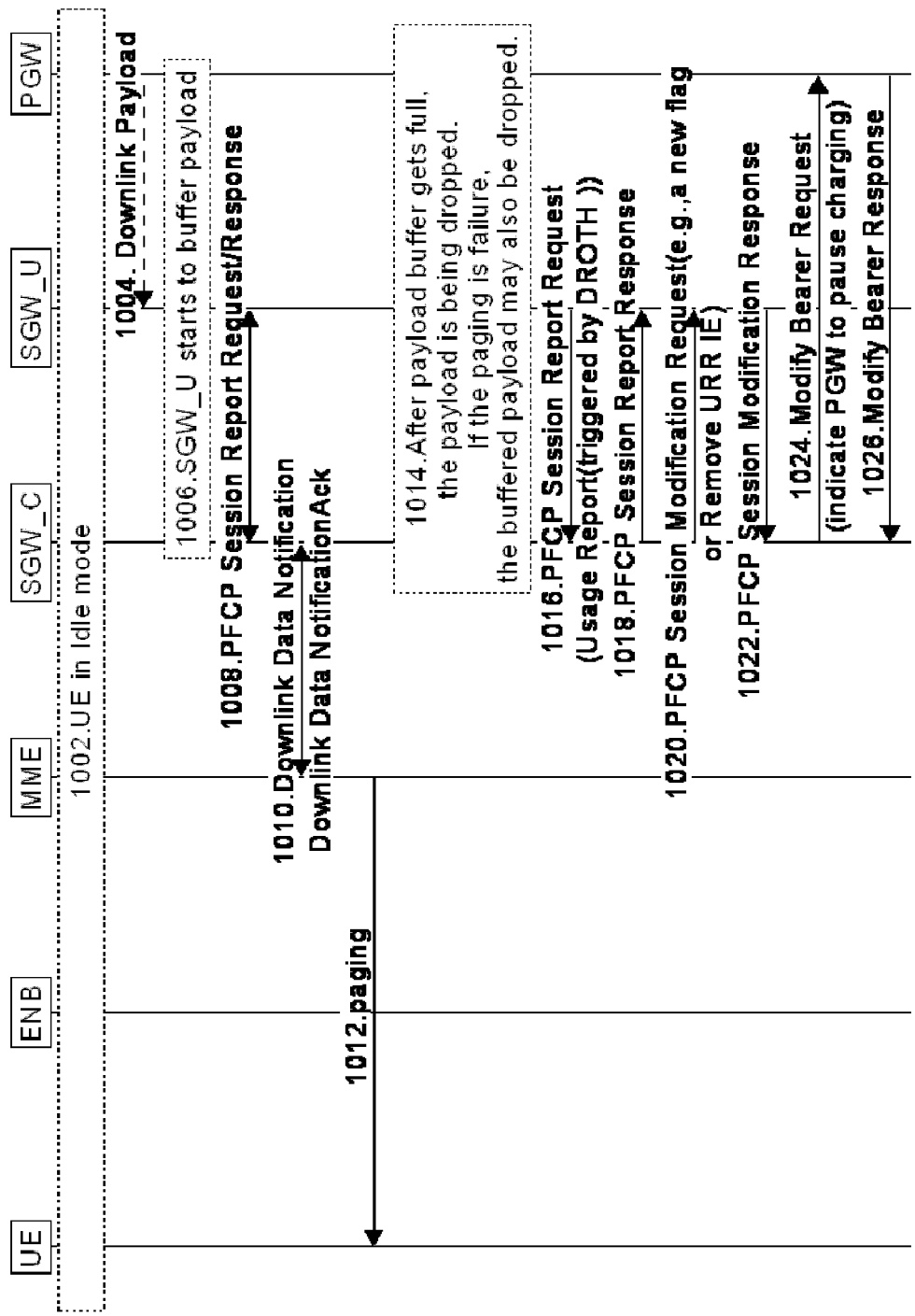
FIG. 10 shows a flowchart of a method according to another embodiment of the present disclosure.

FIG. 10 shows a flowchart of a method according to another embodiment of the present disclosure. For some parts which have been described in the above embodiments, the description thereof is omitted here for brevity.

At step 1002, a UE is in an idle mode.

At step 1004, downlink payload is received by SGW-U from PGW.

At step 1006, SGW-U starts to buffer the downlink data.

At step 1008, SGW-U informs SGW-C that the downlink data is received by using PFCP Session Report Request and SGW-C sends PFCP Session Report Response to SGW-U.

At step 1010, SGW-C sends a Downlink Data Notification message to MME. MME response with a Downlink Data Notification Acknowledge (ACK).

At step 1012, MME pages the UE.

At step 1014, before the UE becomes connected, if the downlink data still comes and the payload buffer is full, the downlink data (e.g., payload) is to be dropped. If the paging is failure, the buffered payload may also be dropped. After payload buffer gets full or when one of the configured thresholds is reached, the payload is being dropped.

At step 1016, when the dropped bytes/packets are reached to "Dropped DL Traffic Threshold", SGW-U sends PFCP Session Report Request with Usage Report (triggered by DROTH)) to SGW-C.

At step 1018, SGW-C sends PFCP Session Report Response message.

At step 1020, SGW-C initiates PFCP Session Modification Request with the new flag as described above or Remove URR IE to inactive the measurement for the URR used to measure the dropped packets/bytes to SGW-U. After receiving the new flag or removing the URR, SGW-U stops the measurement for the URR.

At step 1022, SGW-U sends PFCP Session Modification Response to SGW-C.

At step 1024, SGW-C sends Modify Bearer Request to indicate to pause charging in PGW.

At step 1026, PGW sends Modify Bearer Response.

The above messages as shown in FIG. 10 may be similar to the corresponding message as defined in 3GPP related technical specification (TS) such as TS 23.401, TS 23.402, TS29.244, TS23.214, etc. except that at step 1020, after receiving the Usage Report triggered by DROTH from SGW-U, SGW-C sends the new flag or Remove URR IE and then SGW-U stops the measurement and report for the URR.

Figure 11:
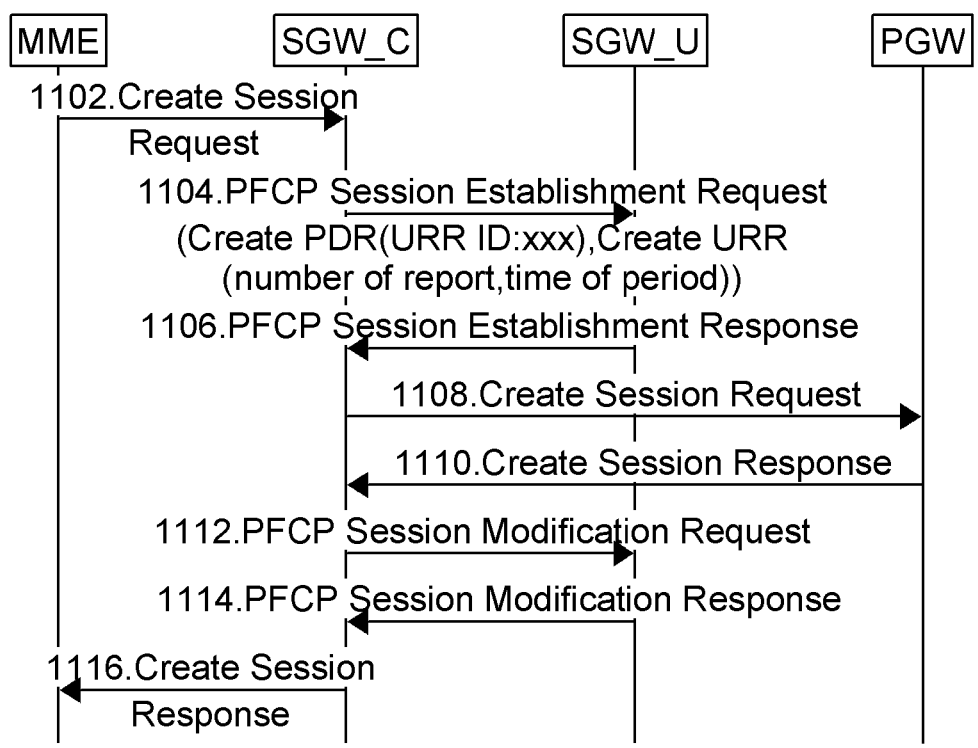
FIG. 11 shows a flowchart of a method according to another embodiment of the present disclosure.

FIG. 11 shows a flowchart of a method according to another embodiment of the present disclosure. For some parts which have been described in the above embodiments, the description thereof is omitted here for brevity.

At step 1102, SGW-C receives Create Session Request from MME.

At step 1104, SGW-C initiates PFCP Session Establishment request to SGW-U, a URR is created used to measure the counts for dropped packets/bytes. New information elements: a number of reports and time of period are added within the URR attribute. Based on these information, SGW-U sends usage reports only a number of times for the corresponding URR until SGW-C indicates SGW-U to reactivate the URR or when the time of period for number of report is expired.

At step 1106, SGW-U sends Session Establishment Response to SGW-C.

At step 1108, SGW-C sends Create Session Request to PGW.

At step 1110, PGW sends Create Session Response to SGW-C.

At step 1112, SGW-C sends PFCP Session Modification Request to SGW-U with uplink tunnel information of PGW.

At step 1114, SGW-U sends PFCP Session Modification Request to SGW-C.

At step 1116, SGW-C sends Create Session Response to MME.

The above messages as shown in FIG. 11 may be similar to the corresponding message as defined in 3GPP related technical specification (TS) such as TS 23.401, TS 23.402, TS29.244, TS23.214, etc. except that at step 1104, new information elements "a number of reports" and "time of period" may be added within the URR attribute.

At step 1202, PGW pause charging is to be stopped because of UE triggered service request or PDN connection suspension.

At step 1204, SGW-C indicates to SGW-U that the measurement of dropped packets/bytes shall be active by updating or sending URR as described above. In addition, the number of reports may be reset as a configured value or predefined value or initial value).

At step 1206, SGW-U sends PFCP Session Modification Response to SGW-C.

At step 1208, SGW-C sends Create Session Request to PGW.

Figure 12:
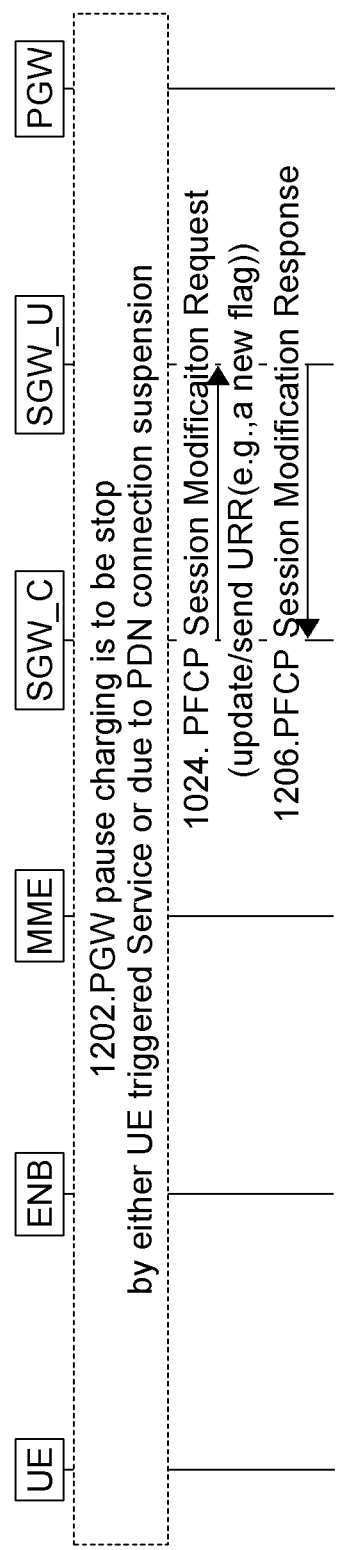
FIG. 12 shows a flowchart of a method according to another embodiment of the present disclosure.

The above messages as shown in FIG. 12 may be similar to the corresponding message as defined in 3GPP related technical specification (TS) such as TS 23.401, TS 23.402, TS29.244, TS23.214, etc. except that at step 1204, URR may be updated or sent and the number of reports may be reset as a configured value or predefined value or initial value.

In an embodiment, 3GPP TS 29.244 V16.0.0 may be modified as following: a new flag as described above may be needed for the Sxa interface message (such as PFCP Session Modification Request/PFCP Session Report Response) for a URR and/or a limited number of report flag/number of report may be needed for URR.

According to various embodiments, when the charging has already been paused in PGW, the measurement for the dropped packets/bytes in SGW-U can be stopped and there is no more PFCP Session Report message between SGW-C and SGW-U.

In an embodiment, Table 7.5.2.4-1 of 3GPP TS 29.244 V16.0.0 may be added the following content. The "Number of Reports" IE may be similar as "the number of reports" as described above.

| Octet 1 and 2 Create URR IE Type = 6 (decimal) | | | | | | |
|---|---|---|---|---|---|---|
| Octets 3 and 4 Length = n | | | | | | |
| Information | | | | Appl. | | |
| elements | P | Condition/Comment | Sxa | Sxb | Sxc | N4 IE Type |
| Number of Reports | O | This IE may be present. When present, it shall indicate the number of reports that the user plane function can send a usage report by the URR. After reporting network resource usage to the CP function based on the reporting triggers, the UP function shall decrement number of reports by "1". The URR becomes inactive when number of reports becomes "0". See NOTE 2. | X | X | X | X Number of Reporting Times |

NOTE 2:
This IE may be provisioned and set to "1" for a URR with the Dropped DL Traffic Threshold to support Pause of Charging feature.

FIG. 12 shows a flowchart of a method according to another embodiment of the present disclosure. For some parts which have been described in the above embodiments, the description thereof is omitted here for brevity.

In an embodiment, Table 7.5.4.4-1 of 3GPP TS 29.244 V16.0.0 may be added the following content. The "Number of Reporting Times" IE may be similar as "the number of reports" as described above.

| Octet 1 and 2 Update URR IE Type = 13 (decimal) | | | | | | |
|---|---|---|---|---|---|---|
| Octets 3 and 4 Length = n | | | | | | |
| Information | | | | Appl. | | |
| elements | P | Condition/Comment | Sxa | Sxb | Sxc | N4 IE Type |
| Number of Reports | O | This IE may be present. When present, it shall indicate the number of reports that the user plane function can | X | X | X | X Number of Reporting |

| Information elements | P | Condition/Comment | Appl. Sxa | Sxb | Sxc | N4 | IE Type |
|---|---|---|---|---|---|---|---|
| | | send a usage report by the URR. After reporting network resource usage to the CP function based on the reporting triggers, the UP function shall decrement number of reports by "1". The URR becomes inactive when number of reports becomes "0". See NOTE X. | | | | | Times |

Octet 1 and 2 Update URR IE Type = 13 (decimal)
Octets 3 and 4 Length = n

In an embodiment, Table 8.1.2-1 of 3GPP TS 29.244 V16.0.0 may be added the following content:

| IE Type value (Decimal) | Information elements | Comment/Reference | Number of Fixed Octets |
|---|---|---|---|
| aaa | Number of Reports | Fixed/Clause 8.2.xx | 2 |
| bbb to 65535 | Spare. For future use. | | |

For example, "aaa" may be 179, "bbb" may be 180. In other embodiment, they may be any other suitable value. "xx" may be may any suitable value.

In an embodiment, clause 8.2.xx Number of Reports may be added in 3GPP TS 29.244 V16.0.0 as following. The Number of Reports IE may be encoded as following. It may contain an Unigned16 binary integer value excluding the first value "0".

| Octets | Bits | | | | | | | |
|---|---|---|---|---|---|---|---|---|
| | 8 | 7 | 6 | 5 | 4 | 3 | 2 | 1 |
| 1 to 2 | Type = aaa (decimal) | | | | | | | |
| 3 to 4 | Length = n | | | | | | | |
| 5 to 8 | Number of Reporting Times | | | | | | | |

Many advantages may be achieved by applying the proposed solution according to embodiments of the present disclosure. For example, some embodiments can avoid the invalid messages between the UP node and the CP node. An example invalid message may be used to trigger PGW pause charging when the charging has already been paused in PGW. Some embodiments can reduce the load in both the UP node and the CP node. For example, the UP node can avoid the measurement and report related to a usage reporting rule and the CP node can avoid receiving and processing the invalid message.

Figure 13A:
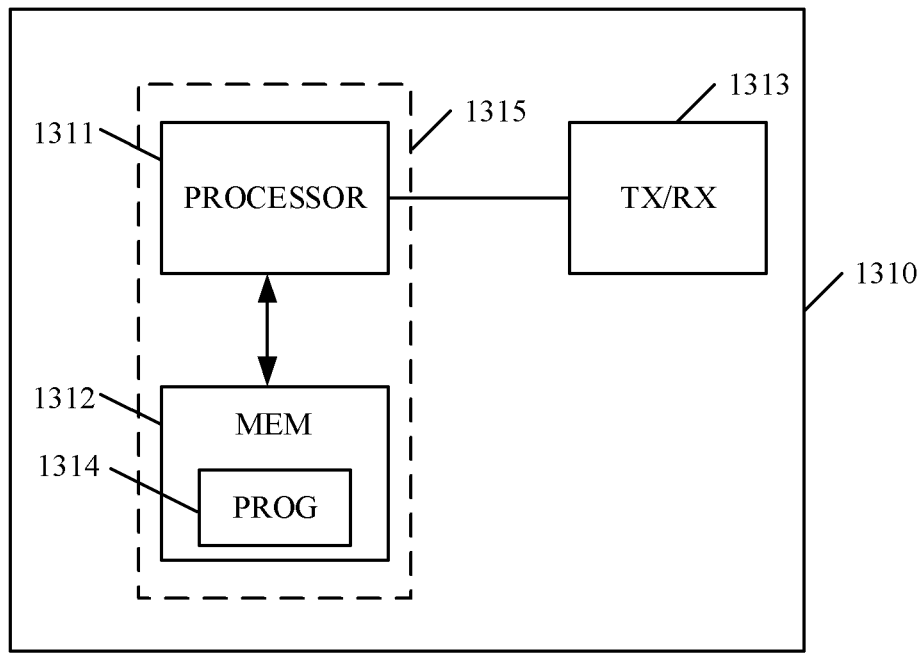
FIG. 13a illustrate a simplified block diagram of an apparatus according to an embodiment of the present disclosure.
Figure 13B:
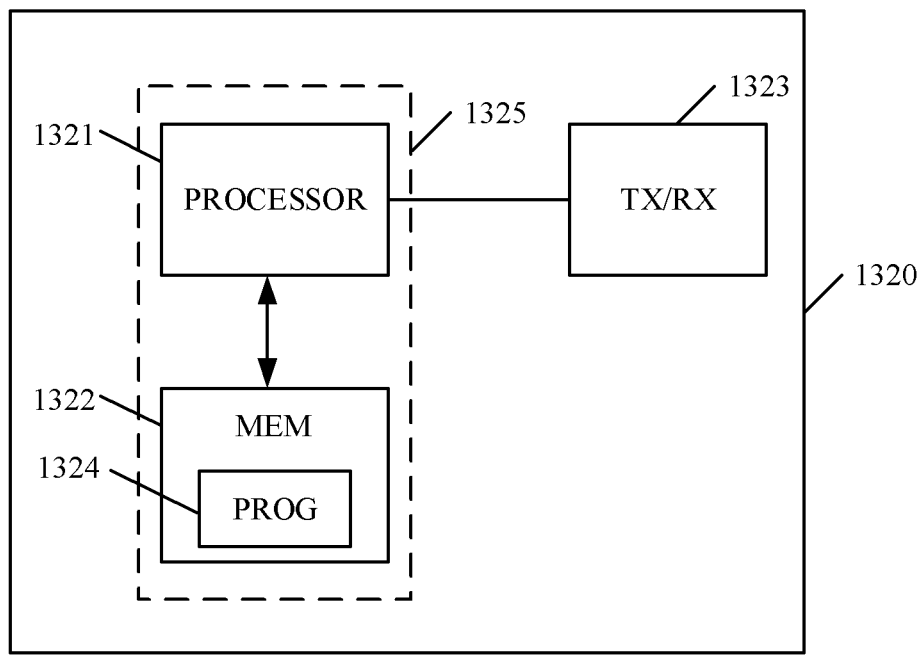
FIG. 13b illustrate a simplified block diagram of an apparatus according to another embodiment of the present disclosure.

FIG. 13a illustrates a simplified block diagram of an apparatus 1310 that may be embodied in/as a control plane function according to an embodiment of the present disclosure. FIG. 13b illustrates an apparatus 1320 that may be embodied in/as a user plane function according to an embodiment of the present disclosure.

The apparatus 1310 may comprise at least one processor 1311, such as a data processor (DP) and at least one memory (MEM) 1312 coupled to the processor 1311. The apparatus 1310 may further comprise a transmitter TX and receiver RX 1313 coupled to the processor 1311. The MEM 1312 stores a program (PROG) 1314. The PROG 1314 may include instructions that, when executed on the associated processor 1311, enable the apparatus 1310 to operate in accordance with the embodiments of the present disclosure, for example to perform the methods related to the control plane function. A combination of the at least one processor 1311 and the at least one MEM 1312 may form processing means 1315 adapted to implement various embodiments of the present disclosure.

The apparatus 1320 comprises at least one processor 1321, such as a DP, and at least one MEM 1322 coupled to the processor 1321. The apparatus 1320 may further comprise a transmitter TX and receiver RX 1323 coupled to the processor 1321. The MEM 1322 stores a PROG 1324. The PROG 1324 may include instructions that, when executed on the associated processor 1321, enable the apparatus 1320 to operate in accordance with the embodiments of the present disclosure, for example to perform the methods related to the user plane function. A combination of the at least one processor 1321 and the at least one MEM 1322 may form processing means 1325 adapted to implement various embodiments of the present disclosure.

Various embodiments of the present disclosure may be implemented by computer program executable by one or more of the processors 1311 and 1321, software, firmware, hardware or in a combination thereof.

The MEMS 1312 and 1322 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples.

Figure 14:
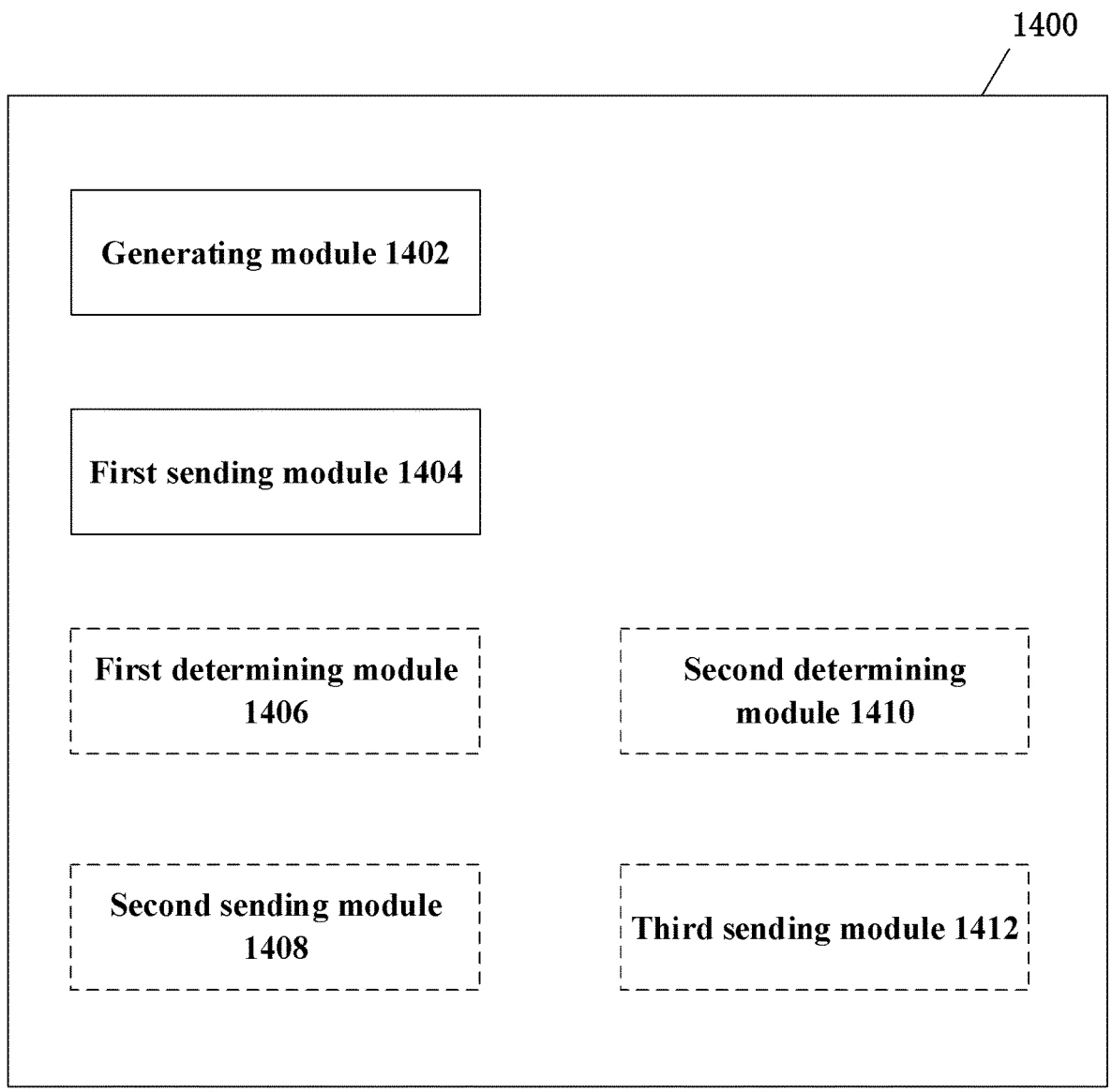
FIG. 14 illustrate a simplified block diagram of a control plane function according to an embodiment of the present disclosure.

FIG. 14 illustrates a simplified block diagram of a control plane function according to an embodiment of the present disclosure. The control plane function may be one of PGW-C, SGW-C, TDF-C, and SMF. The control plane function 1400 comprises a generating module 1402 configured to generate an information element to indicate a number of reports that the user plane function can send a usage report to the control plane function. The control plane function 1400 further comprises a first sending module 1404 configured to send the information element to the user plane function.

In an embodiment, the generating module 1402 is further configured to generate an information element to inactivate a measurement and report related to a usage reporting rule in a user plane function.

In an embodiment, the control plane function 1400 may further comprise a first determining module (optional) 1406 configured to determine to activate the measurement and report related to the usage reporting rule in the user plane function. The control plane function 1400 may further comprise a second sending module (optional) 1408 configured to send an indicator to activate the measurement and report related to the usage reporting rule in the user plane function.

In an embodiment, the control plane function 1400 may further comprise a second determining module (optional) 1410 configured to determine to activate the usage report in the user plane function. The control plane function 1400 may further comprise a third sending module (optional) 1412 configured to send an indicator to activate the usage report in the user plane function.

Figure 15:
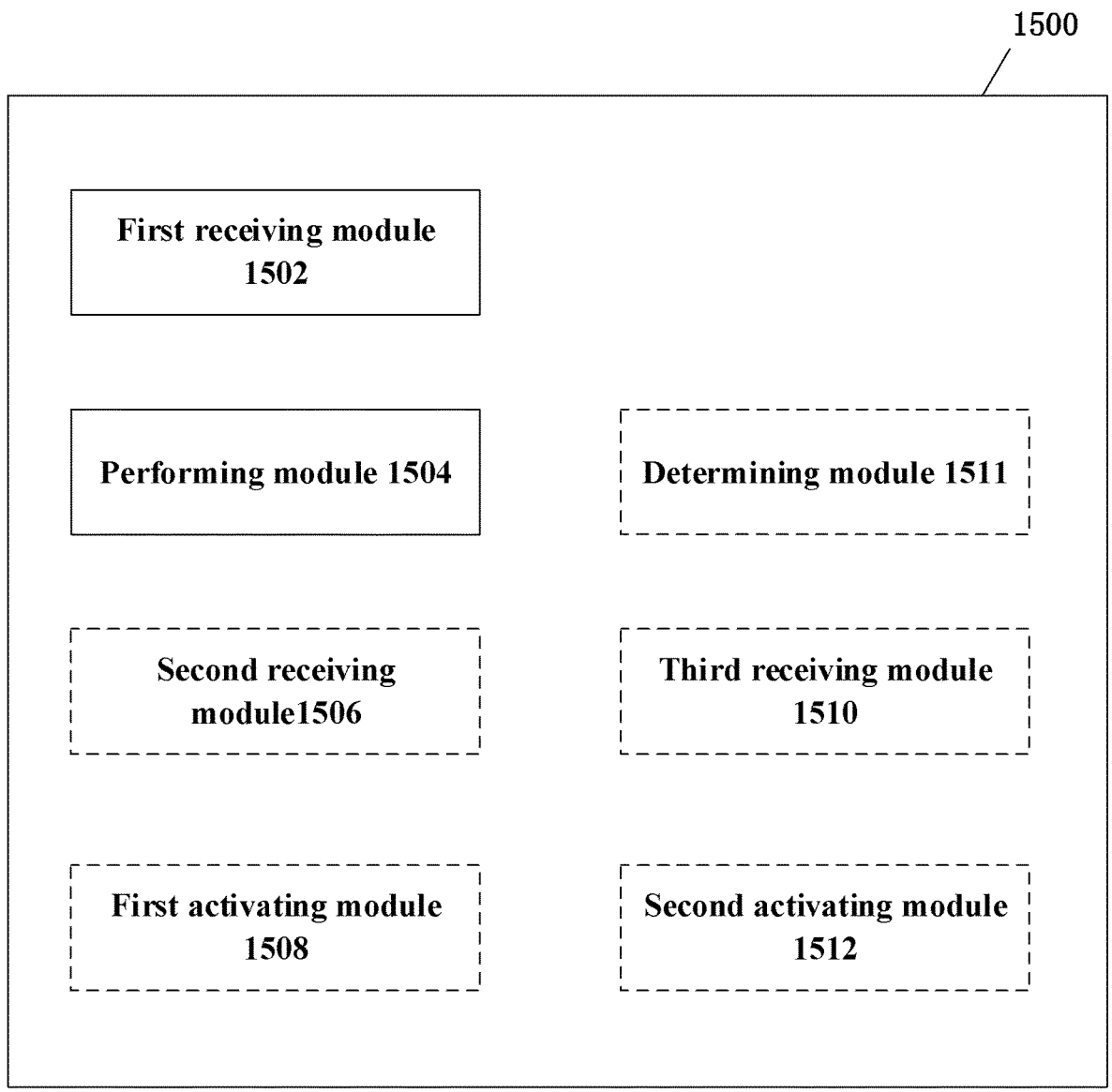
FIG. 15 illustrate a simplified block diagram of a user plane function according to an embodiment of the present disclosure.

FIG. 15 illustrates a simplified block diagram of a user plane function according to an embodiment of the present disclosure. The user plane function may be one of PGW-U, SGW-U, TDF-U, and UPF. The user plane function 1500 comprises a first receiving module 1502 configured to receive from a control plane function an information element to indicate a number of reports that the user plane function can send a usage report to the control plane function. The control plane function 1500 further comprises a performing module 1504 configured to perform at least one operation based on the information element.

In an embodiment, the first receiving module 1502 is further configured to receive from a control plane function an information element to inactivate a measurement and report related to a usage reporting rule in the user plane function.

In an embodiment, the user plane function 1500 may further comprise a second receiving module (optional) 1506 configured to receive an indicator to activate the measurement and report related to the usage reporting rule in the user plane function. The user plane function 1500 may further comprise a first activating module (optional) 1508 configured to activate the measurement and report related to the usage reporting rule in the user plane function.

In an embodiment, the user plane function 1500 may further comprise a third receiving module (optional) 1510 configured to receive an indicator to activate the usage report in the user plane function. The user plane function 1500 may further comprise a determining module (optional) 1511 configured to determine the time of period set for the number of reports has elapsed. The user plane function 1500 may further comprise a second activating module (optional) 1512 configured to activate the usage report in the user plane function.

According to an aspect of the disclosure it is provided a computer program product being tangibly stored on a computer readable storage medium and including instructions which, when executed on at least one processor, cause the at least one processor to carry out the method related to the control plane function as described above.

According to an aspect of the disclosure it is provided a computer program product being tangibly stored on a computer readable storage medium and including instructions which, when executed on at least one processor, cause the at least one processor to carry out the method related to the user plane function as described above.

According to an aspect of the disclosure it is provided a computer-readable storage medium storing instructions which when executed by at least one processor, cause the at least one processor to perform the method related to the control plane function as described above.

According to an aspect of the disclosure it is provided a computer-readable storage medium storing instructions which when executed by at least one processor, cause the at least one processor to perform the method related to the user plane function as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a control plane function, comprising:
generating an information element that includes a usage reporting rule to indicate a number of usage reports that a user plane function can send to the control plane function;
sending the information element to the user plane function, wherein a usage report is related to traffic measured by the user plane function and the usage report is based on the usage reporting rule; and
sending an indicator that activates the measurement related to traffic and the usage report based on the usage reporting rule at the user plane function, wherein, subsequent to the activation, the usage reports become inactive after the number of usage reports indicated by the information element have been reported.

2. The method according to claim 1, further comprising:
determining to activate a measurement and the usage report related to the usage reporting rule in the user plane function; and
sending an indicator to activate the measurement and the usage report related to the usage reporting rule in the user plane function.

3. The method according to claim 1, wherein the information element to indicate the number of usage reports that the user plane function can send to the control plane function is sent in a session establishment request or a session modification request.

4. The method according to claim 1, wherein the number of usage reports is set to "1" for a usage reporting rule with a dropped downlink traffic threshold to support pause of charging feature.

5. The method according to claim 1, wherein the information element to indicate the number of usage reports that the user plane function can send to the control plane function is included in the usage reporting rule.

6. The method according to claim 1, further comprising:
determining to activate the usage report in the user plane function; and
sending an indicator to activate the usage report in the user plane function.

7. The method according to claim 1, wherein a time of period for the number of usage reports is set by the control plane function or the user plane function and after the time of period the user plane function restarts a measurement and the usage report related to the usage reporting rule.

8. The method according to claim 1, wherein the usage reporting rule and the usage report are related to dropped downlink traffic; and/or
wherein the usage reporting rule and the usage report are related to a session.

9. The method according to claim 1, wherein the control plane function is one of packet data network (PDN) gateway control plane function (PGW-C), serving gateway control plane function (SGW-C), traffic detection function control plane function (TDF-C), and session management function (SMF), and the user plane function is one of PDN gateway user plane function (PGW-U), serving gateway user plane function (SGW-U), traffic detection function user plane function (TDF-U) and user plane function (UPF).

10. A method at a user plane function, comprising:
receiving from a control plane function an information element that includes a usage reporting rule to indicate a number of usage reports that the user plane function can send to the control plane function; and
performing at least one operation based on the information element, wherein usage report is related to traffic measured by the user plane function and the usage report is based on the usage reporting rule; and
receiving from the control plane function an indicator that activates the measurement related to traffic and the usage report based on the usage reporting rule at the user plane function, wherein, subsequent to the activation, the usage reports become inactive after the number of usage reports indicated by the information element have been reported.

11. The method according to claim 10, wherein the at least one operation comprises inactivating a measurement and the usage report related to the usage reporting rule in the user plane function.

12. The method according to claim 10, further comprising:
receiving an indicator to activate a measurement and the usage report related to a usage reporting rule in the user plane function; and
activating the measurement and the usage report related to the usage reporting rule in the user plane function.

13. The method according to claim 10, wherein the information element to indicate the number of usage reports that the user plane function can send to the control plane function is received in a session establishment request or a session modification request.

14. The method according to claim 10, wherein the number of usage reports is set to "1" for the usage reporting rule with a dropped downlink traffic threshold to support pause of charging feature.

15. The method according to claim 10, wherein the information element to indicate the number of usage reports that the user plane function can send to the control plane function is included in the usage reporting rule.

16. The method according to claim 10, wherein the at least one operation comprises decrementing the number of usage reports by "1" after the user plane function sending a usage report to the control plane function and inactivating a measurement and the usage report when the number of usage reports is decremented to "0".

17. The method according to claim 10, further comprising:
receiving an indicator to activate the usage report in the user plane function or determining a time of period set for the number of usage reports has elapsed; and
activating a usage report in the user plane function.

18. The method according to claim 10, wherein a time of period for the number of usage reports is set by the control plane function or the user plane function and after a time of period the user plane function restarts a measurement and the usage report related to the usage reporting rule.

19. The method according to claim 10, wherein the usage reporting rule and the usage report are related to dropped downlink traffic; and/or
   wherein the dropped downlink traffic and the usage report are related to a session.

20. An apparatus at a control plane function, comprising:
   a processor; and
   a memory coupled to the processor, said memory containing instructions executable by said processor, whereby said apparatus is operative to:
      generate an information element that includes a usage reporting rule to indicate a number of usage reports that a user plane function can send to the control plane function; and
      send the information element to the user plane function, wherein usage report is related to traffic measured by the user plane function and the usage report is based on the usage reporting rule; and
      send an indicator that activates the measurement related to traffic and the usage report based on the usage reporting rule at the user plane function, wherein, subsequent to the activation, the usage reports become inactive after the number of usage reports indicated by the information element have been reported.

21. An apparatus at a user plane function, comprising:
   a processor; and
   a memory coupled to the processor, said memory containing instructions executable by said processor, whereby said apparatus is operative to:
      receive from a control plane function an information element that includes a usage reporting rule to indicate a number of usage reports that the user plane function can send to the control plane function; and
      perform at least one operation based on the information element, wherein usage report is related to traffic measured by the user plane function and the usage report is based on the usage reporting rule; and
      receive an indicator that activates the measurement related to traffic and the usage report based on the usage reporting rule at the user plane function, wherein, subsequent to the activation, the usage reports become inactive after the number of usage reports indicated by the information element have been reported.

* * * * *